(12) United States Patent
Liu

(10) Patent No.: US 7,549,006 B2
(45) Date of Patent: Jun. 16, 2009

(54) STRUCTURE OF OBJECT STACKS FOR DRIVER

(75) Inventor: Chih Hao Liu, Taipei (TW)

(73) Assignee: Via Technologies, Inc., Taipei (TW)

( * ) Notice: Subject to any disclaimer, the term of this patent is extended or adjusted under 35 U.S.C. 154(b) by 173 days.

(21) Appl. No.: 11/717,720

(22) Filed: Mar. 14, 2007

(65) Prior Publication Data
US 2007/0276979 A1    Nov. 29, 2007

(30) Foreign Application Priority Data
May 26, 2006    (TW)  ............................... 95118823 A

(51) Int. Cl.
*H05K 7/10* (2006.01)
*G06F 9/445* (2006.01)

(52) U.S. Cl. ...................... 710/302; 717/174

(58) Field of Classification Search .................. 710/72, 710/74, 300, 302, 304; 703/4, 17, 21, 24; 717/168, 169, 174
See application file for complete search history.

(56) References Cited

U.S. PATENT DOCUMENTS

| | | | |
|---|---|---|---|
| 6,820,146 B2 * | 11/2004 | Cox | 710/74 |
| 6,980,944 B1 * | 12/2005 | Oshins et al. | 703/17 |
| 7,082,598 B1 * | 7/2006 | Le et al. | 717/127 |
| 7,246,192 B1 * | 7/2007 | Chang | 710/311 |
| 2003/0065857 A1 * | 4/2003 | Lin | 710/302 |
| 2004/0019709 A1 * | 1/2004 | Bissessur et al. | 710/14 |
| 2005/0193159 A1 * | 9/2005 | Ng et al. | 710/302 |
| 2007/0143316 A1 * | 6/2007 | Chen et al. | 707/100 |
| 2008/0059670 A1 * | 3/2008 | Lui | 710/110 |

OTHER PUBLICATIONS

Example WDM Device Stack, MSDN, Microsoft Corporation, Copyright @2008.*
Types of WDM Drivers, MSDN, Microsoft Corporation, Coptright @2008.*

* cited by examiner

*Primary Examiner*—Khanh Dang
(74) *Attorney, Agent, or Firm*—Rosenberg, Klein & Lee

(57) ABSTRACT

A structure of object stacks for driver with hot plug function is provided, wherein the hot plug function is with serial ATA device, which can be supported by standard IDE driver. The structure comprises a bus device stack, at least one port device stack and at least one serial ATA device stack, which are connected to serial ATA devices at each of channels of the bus and each of channels within the bus respectively, wherein each of bus device stacks comprises an upper-level filter bus device object, and each of port device stacks comprises respectively a lower-level filter port device object and an upper-level filter port device object. Thus, the hot plug function can be supported according to the massage transmission interface and status monitoring for the bus by each of filter device objects.

20 Claims, 2 Drawing Sheets

STRUCTURE OF OBJECT STACKS FOR DRIVER

FIELD OF THE INVENTION

The present invention relates to a structure of objects stack for driver, and more particularly to a structure of objects stack for driver with hot plug function, which is with serial ATA device, and can be supported by standard IDE driver.

BACKGROUND OF THE INVENTION

Recently, due to the highly development of information industry and the increasingly demand of the operation and transmission of information products, the manufactures make efforts in the development of various transmission interfaces at every moment. With respect to storage interface, the earliest ATA (Advanced Technology Attachment) interface with the transmission speed of 16 MBps is replaced by ATA33 interface supporting 33 MBps, ATA66 interface supporting 66 MBps, and moreover the further developed ATA100 and ATA133 interfaces. However, the length of the transmission line gets limited and it is difficult to improve the transmission speed as the above-mentioned ATA interfaces are used by the method of parallel transmission so that plenty of signal lines for transmission that are needed result in large noise disturbance.

Consequently, a lot of manufactures constantly try to develop more efficient transmission way; thus, in the market, it is easy not only to highly increase the transmission speed, but also to support hot plug function that can be convenient to users with the implementation of serial ATA interface.

To fit the compatibility of the upgraded peripheral devices, the standard serial ATA interface is designed to be compatible with standard IDE driver. The structure of object stacks for driver shown in FIG. 1 comprises a bus device stack 130, a port device stack 150, a port device stack 155, a hard disk device stack 170, and an optical device stack 190. The bus device stack 130 comprises a host bus adapter physical device object (HBA DO) 12 and a HBA function device object (HBA FDO) 14, the port device stack 150 comprises a channel physical device object (channel PDO) 161 and a channel function device object (channel FDO) 163, the port device stack 155 comprises a channel PDO 181 and a channel FDO 183.

Furthermore, a hard disk physical device object 165 and an optical disk physical device object 185 are set up depending on the classification of the peripheral devices that are connected to each channel.

Thereafter, a hard disk function device object 167 and an optical disk function device object 187 are set up respectively, and a partition filter device object 169 and an optical disk filter device object 189 can respectively communicate with the serial connected hard disk and optical disk (not shown).

Although the above-mentioned structure of objects stack for driver can support driving the serial ATA device by standard IDE driver, the lack of hot plug function makes users troubled because the standard IDE driver doesn't support hot plug function.

Therefore, the key point of development is to design a driver used to support hot plug function for serial ATA devices based on standard IDE driver in accordance with the pervious mentioned shortcomings of the prior art.

SUMMARY OF THE INVENTION

Accordingly, the present invention provides a structure of object stacks for computer-executable driver stored in a computer-readable medium, comprising a bus device stack, used to serve as a communication interface adjacent to an IDE bus and a PCI bus, for communicating with the IDE bus, served as the upper level of the bus device stack, and the PCI bus, served as the lower level of the bus device stack, at least one port device stack, designated on the upper level of the bus device stack and adjacent to at least one channel of the IDE bus, for operating functions of each channel, and at least one IDE device stack, adjacent to at least one serial ATA device coupled to a specific channel, for being designated on the upper level of a related port device stack, which is adjacent to a related channel coupled to a related serial ATA device, wherein, the bus device stack comprises an upper-level bus filter device object, the port device stack comprises a lower-level port filter device object and an upper-level port filter device object, and a hot plug function is provided by the use of the upper-level bus filter device object, the lower-level port filter device object and the upper-level port filter device object with bus status monitoring and signal transmission interfaces.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
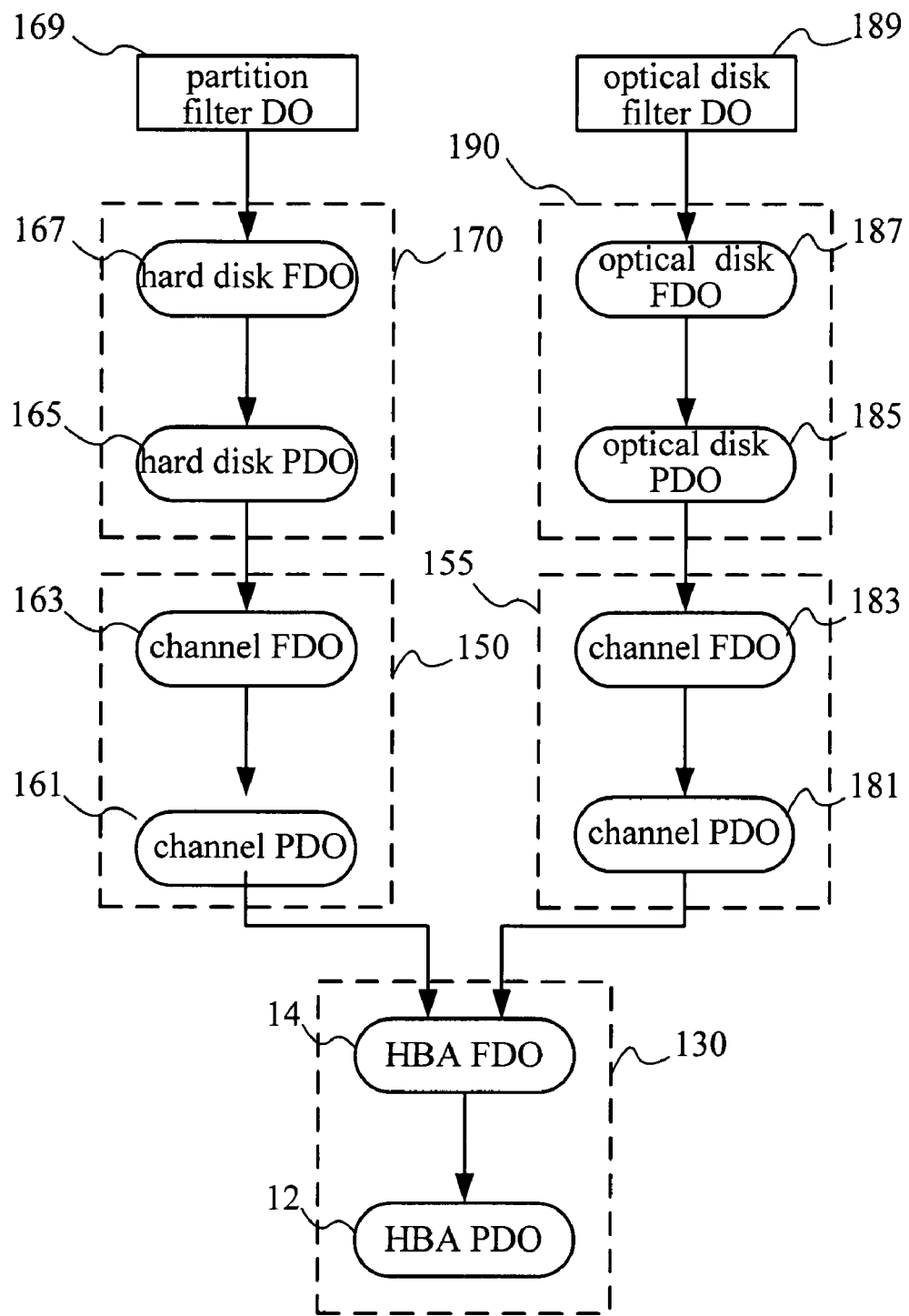
FIG. 1 is a traditional structure of object stacks for driver.
Figure 2:
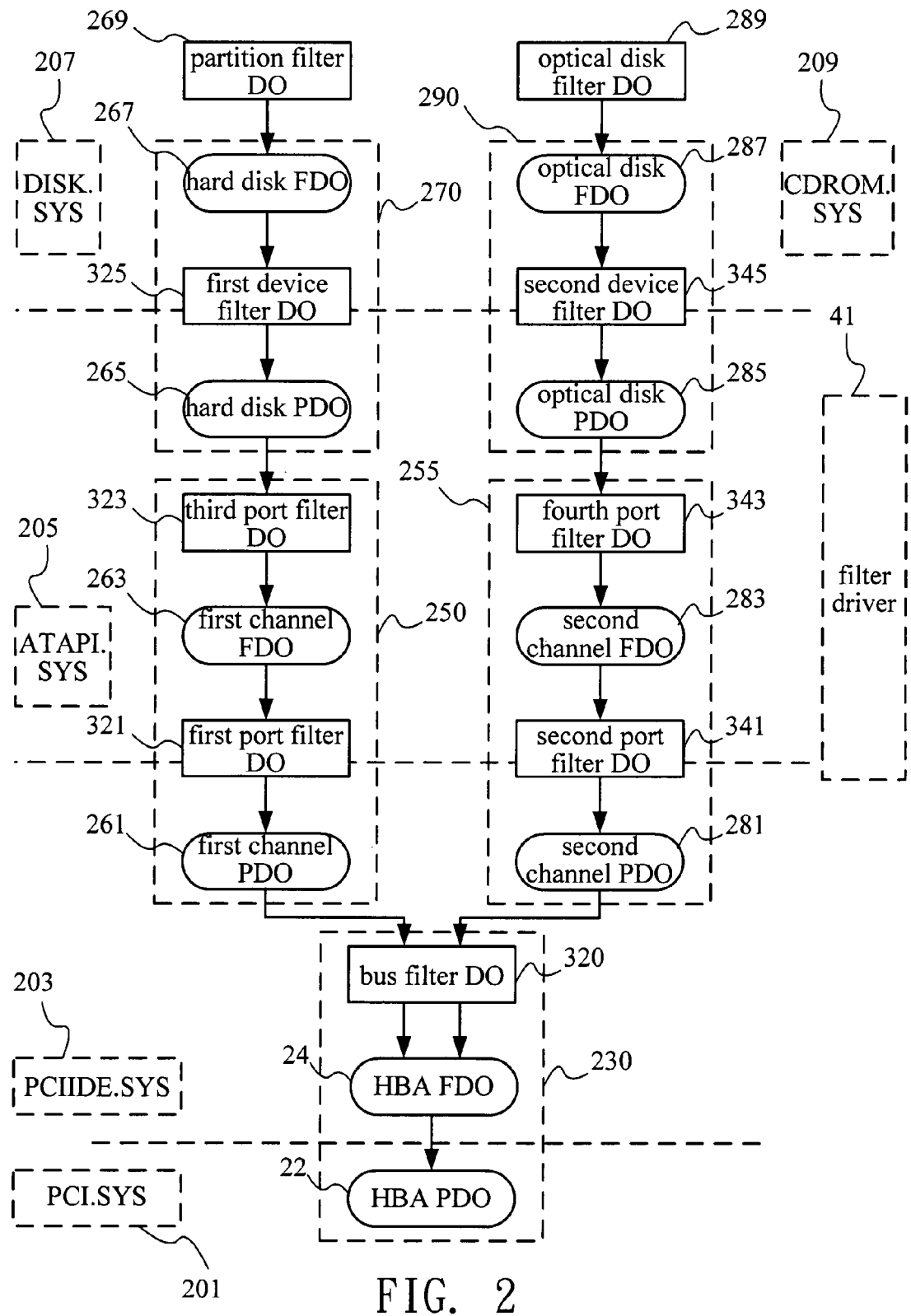
FIG. 2 is a structure of object stacks for driver according to a preferred embodiment of the present invention.

Referring to FIG. 2, a structure of object stacks for driver is provided according to a preferred embodiment of the present invention. Driving serial ATA devices by standard integrated drive electronics (IDE) driver and supporting hot plug function is the main feature of the present invention.

Take an IDE bus connecting with a SATA (serial ATA) HDD (hard disk driver) and a SATA optical disk driver for example: the IDE driver comprises a peripheral component interconnect (PCI) driver 201 such as PCI.SYS, a bus driver 203 such as PCIIDE.SYS, a port driver 205 such as ATAPI.SYS, a disk driver 207 such as DISK.SYS, and a optical disk driver 209 such as CDROM.SYS. Besides, the hot plug function can be supported by the use of inserting filter device objects into proper positions via a filter driver 41.

The structure of object stacks comprises a bus device stack 230 designated on the bottom, a first port device stack 250 and a second port device stack 255 designated in the middle-level, a hard disk device stack 270 and a optical disk device stack 290 designated on the top. A partition filter device object 169 such as PartMgr.sys, and an optical filter device object 189 such as redbook.sys, can respectively communicate with the serial connected hard disk device and optical disk device.

With respect to the structure, the PCI driver 201 sets up a host bus adapter physical device object 22 (HBA PDO) at first, and the bus driver 203 sets up host bus adapter function device object 130 (HBA FDO). The filter driver 41 sets up a bus filter device object 320 (filter DO) attached on the upper-level of the HBA PDO 22 for serving as an upper-level filter DO. Thus, a bus device stack 230 is set up by the HBA PDO 22, the HBA FDO 24, and the bus filter DO 320, and is used to operate the functions of bus.

The filter device DO 320 can set up a bus input/output request package (IRP) for querying the bus what standard interface it belongs to through the lower-level driver thereof, such as PCI driver, thus, the driver can access the data from HBA register through the interface standard.

Since the operation system (OS) queries the bus relations of the HBA FDO 24, the bus driver 203 will repost the status of the channel and set up the first channel object device object 261 and the second channel physical device object 281 adjacent to each channel of the IDE bus. The bus filter DO 320 can monitor the previous querying and report, and further, the filter driver 41 can set up the first port filter device object 321 and the second port filter device object 341, which are respectively attached on the corresponding channel PDO. The port filter DO 321 and 341 can get the pointer of the PCI bus interface and identify what standard interface the PCI bus belongs to, thus, a port filter-defined interface can be recognized and set up.

After that, the OS will load the port driver 205 that sets up the first channel function device object 263 and the second channel function device object 283 respectively attached on the upper-level of the first port filter DO 321 and the second port filter DO 341. The filter driver 41 sets up a third port filter device object 323 and a fourth port filter device object 343 respectively attached on the upper-level of the first channel FDO 263 and the second channel FDO 283, wherein the first port device stack 250 is formed with the first channel PDO 261, the first port filter DO 321, the first channel FDO 263 and the third port filter DO 323, and the second port device stack 255 is formed with the second channel PDO 281, the second port filter DO 341, the second channel FDO 283, and the fourth port filter DO 343. The first port filter DO 321 and the second port filter DO 341 are respectively served as the lower-level filter DO of the first port device stack 250 and the second device stack 255, and the third port filter DO 323 and the fourth port filter DO 343 are respectively served as the upper-level filter DO of the first port device stack 250 and the second device stack 255.

The third port filter DO 323 and the fourth port filter DO 343 respectively set up a port IRP, and query the first port filter DO 321 and the second port filter DO 343 what standard interface they belong to through the port IRP. Besides, the third port filter DO 323 and the fourth port filter DO 343 can respectively transmit the port IRP to the lower-level, such as channel PDO 261 and 281, through the channel FDO 263 and 283, the port filter DO 321 and 341. After the first port filter DO 321 and the second port filter DO 341 receive the port IRP, the demanded data will be stored in the data buffer regarding as the defined port filter interface standard, the third port filter DO 323 and the fourth port filter DO 343 can get the demanded data through the port filter interface standard. Further, the third port filter DO 323 and the fourth port filter DO 343 can also get the HBA register through the port filter interface standard for monitoring the event of hot plugging at the corresponding channel or the abnormal status from the connected device, and inform the OS, such as windows, to proceed the rescanning or resetting for the corresponding channel or device.

As the OS is querying the bus relation of the channel FDO 263 and 283, the port driver 205 will report the device that is connected to each channel, and set up the physical device object with corresponding to each device. Within the embodiment of the present invention, the first channel is connected to a serial ATA hard disk device; the second channel is connected to a serial ATA optical disk device. The port driver 205 reports and sets up a hard disk physical device object 265 and an optical disk physical device object 285 attached on the upper-level of the third port filter DO 323 and the fourth port filter DO 343. And, the third port filter DO 323 and the fourth port filter DO 343 can monitor the pervious querying and report, the filter driver 41 can set up the first device filter device object 325 and the second device filter device object 345 attached on the upper-level of the hard disk PDO 265 and the optical disk PDO 285.

Finally, the hard disk driver 207 and the optical disk driver 209 respectively set up the hard disk function device object 267 and the optical disk function device object 287 attached on the upper-level of the first device filter DO 325 and the second device filter DO 345, wherein the hard disk device stack 270 is formed with the hard disk PDO 265, the first device filter DO 325, and the hard disk FDO 267, and the optical disk device stack 290 is formed with the optical disk PDO 285, the second device filter DO 345 and the optical disk FDO 287. Data can be transferred between the hard disk device stack 270 and the partition filter device object 269, or between the optical disk device stack 290 and the optical disk filter device object 289. The first device filter DO 325 and the second device filter DO 345 are respectively served as the lower-level filter device object of the hard disk device stack 270 and the optical disk device stack 290.

The first device filter DO 325 and the second device filter DO 345 can set up the corresponding serial hard disk and optical disk to support hot plug function, that is, as the OS is querying the capability of devices, the OS will monitor the querying and report the device is hot pluggable. Thus, due to the structure of object stacks for driver according to the present invention, the serial ATA device can be drove by standard IDE device driver, and the hot plug function is provided for users' convenience.

In summary, it is appreciated that the present invention is related to a structure of object stacks for driver, and more particularly to a structure of object stacks for driver with hot plug function provided to serial ATA device drove by standard IDE driver. That is, the proper filter device object is used to insert into the structure of object stacks within standard IDE device driver. Furthermore, due to monitoring the bus status and the massage transmission interface, the hot plug function can be supported.

The foregoing description is merely one embodiment of present invention and not considered as restrictive. All equivalent variations and modifications in process, method, feature, and spirit in accordance with the appended claims may be made without in any way from the scope of the invention.

What is claimed is:

1. A computer-executable driver stored in a computer-readable medium, comprising:

a bus device stack, used to serve as a communication interface adjacent to an IDE bus and a PCI bus, for communicating with said IDE bus, served as the upper level of said bus device stack, and said PCI bus, served as the lower level of said bus device stack;

at least one port device stack, designated on the upper level of said bus device stack and adjacent to at least one channel of said IDE bus, for operating functions of each channel; and at least one IDE device stack, adjacent to at least one serial ATA device coupled to a specific channel, for being designated on the upper level of a related port device stack, which is adjacent to a related channel coupled to a related serial ATA device;

wherein, said bus device stack comprises an upper-level bus filter device object, said port device stack comprises a lower-level port filter device object and an upper-level port filter device object, and a hot plug function is provided by the use of said upper-level bus filter device object, said lower-level port filter device object and said upper-level port filter device object with bus status monitoring and signal transmission interfaces.

2. The computer-executable driver according to claim 1, wherein each IDE device stack further comprises a lower-level device filter object for enabling said related serial ATA device to support said hot plug function.

3. The computer-executable driver according to claim 1, wherein said bus device stack further comprises a host bus adapter physical device object and a host bus adapter function device object, and said host bus adapter physical device object, said host bus adapter function device object and said upper-level bus filter device object are in bottom-to-top order.

4. The computer-executable driver according to claim 3, wherein said upper-level bus filter device object can establish a bus input/output request package for asking said PCI what standard interface it belongs to.

5. The computer-executable driver according to claim 3, wherein said host bus adapter physical device object is established via a PCI driver.

6. The computer-executable driver according to claim 3, wherein said host bus adapter function device object is established via a bus driver.

7. The computer-executable driver according to claim 1, wherein said port device stack further comprises a channel physical device object and a channel function device object, and said channel physical device object, said lower-level port filter device object, said channel function device object, and said upper-level port filter device object are in bottom-to-top order.

8. The computer-executable driver according to claim 7, wherein said lower-level port filter device object receives an acknowledgement from said PCI bus about what standard interface it belongs to and defines a standard interface for each port filter device object.

9. The computer-executable driver according to claim 7, wherein said upper-level port filter device object establishes a port input/output request package for asking a low-level port filter what standard interface it belongs to.

10. The computer-executable driver according to claim 7, wherein said upper-level port filter device object detects an abnormal status and a hot-plug event at each channel, and informs an operating system to selectively operate a rescanning or a resetting procedure according to said abnormal status and said hot-plug event.

11. The computer-executable driver according to claim 7, wherein said channel physical device object is established via a bus driver.

12. The computer-executable driver according to claim 7, wherein said channel function device object is established via a port driver.

13. The computer-executable driver according to claim 2, wherein said IDE device stack further comprises a device physical device object and a device function device object, and said device physical device object, said lower-level device filter device object and said device function device object are in bottom-to-top order.

14. The computer-executable driver according to claim 13, wherein said device physical device object is established via a port driver.

15. The computer-executable driver according to claim 13, wherein said device function device object is established via an IDE device driver that drives said related serial ATA device.

16. The computer-executable driver according to claim 1, wherein each filter device object is established via a filter driver.

17. The computer-executable driver according to claim 2, wherein each filter device object is established via a filter driver.

18. The computer-executable driver according to claim 6, wherein said bus driver is a standard PCIIDE driver.

19. The computer-executable driver according to claim 12, wherein said port driver is a standard ATAPI driver.

20. The computer-executable driver according to claim 14, wherein said port driver is a standard ATAPI driver.

* * * * *